A. R. GROTZ.
METHOD AND MEANS FOR PRODUCING LANTERN GLOBES.
APPLICATION FILED OCT. 8, 1917.
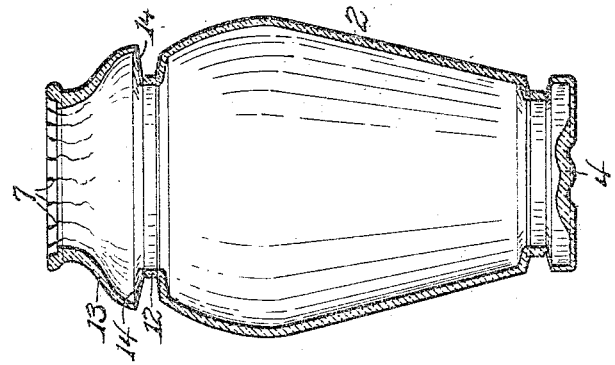
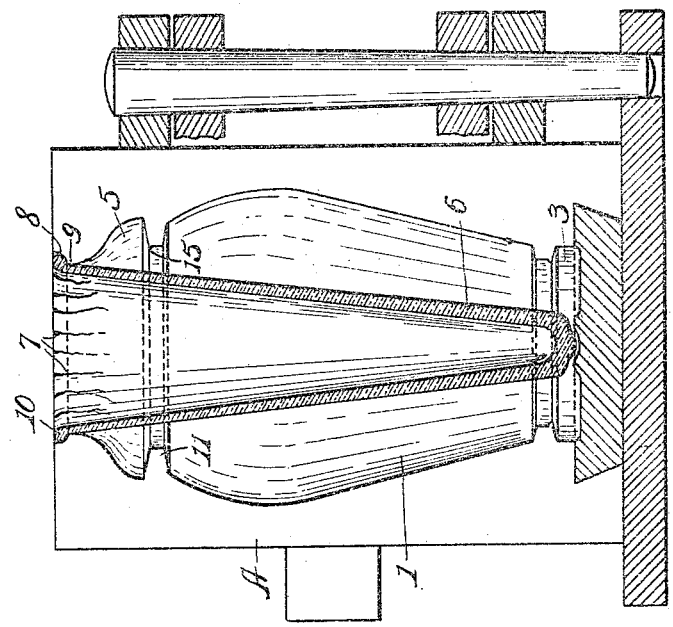
INVENTOR
Albert R. Grotz
BY
ATTORNEY

UNITED STATES PATENT OFFICE.

ALBERT R. GROTZ, OF WELLSBURG, WEST VIRGINIA.

METHOD AND MEANS FOR PRODUCING LANTERN-GLOBES.

1,276,647.

Specification of Letters Patent. Patented Aug. 20, 1918.

Application filed October 8, 1917. Serial No. 195,242.

*To all whom it may concern:*

Be it known that I, ALBERT R. GROTZ, a citizen of the United States of America, and resident of Wellsburg, county of Brooke, and State of West Virginia, have invented certain new and useful Improvements in Methods and Means for Producing Lantern-Globes, of which the following is a specification.

This invention relates to a novel method and means for forming lantern globes and the like, and it has for its primary object to provide a method and means whereby mechanically perfect lantern globes of uniform thickness throughout may be economically produced.

A further object is to provide a method whereby tubular articles of glassware, such as lantern globes, may be mechanically blown and a perfectly uniform distribution of glass accomplished.

It has heretofore been the practice to form mechanically blown tubular glass articles with one end finished and with a detachable portion, or "bust-off" at the other end, or at that end which seats in the bottom end of the mold. When so blown, the glass of the pressed blank inserted in the blow-mold becomes quickly chilled at the end at which the blow-head seats and, consequently, does not distribute as readily as does the glass at points remote from said end. The result of this is that the blown article has a greater thickness at and adjacent to the end from which it is blown than elsewhere; or, if the walls of the body of the ware are made of a thickness which corresponds to that of the end from which the blowing is performed, the same are of such undue thickness that they will not withstand the sudden expansion and contraction to which they are subjected when the ware is used for illuminating purposes. Further, due to the sudden chilling to which it is subjected in the blank-pressing mold, the glass at and adjacent to the mouth of the pressed blank is cracked and crushed in the pressing operation to such a marked extent that clearly perceptible craze-marks or lines of fracture appear therein. Consequently, blown ware which embodies therein the glass that is so injured is necessarily fragile and not well suited for illuminating purposes.

It is the purpose of the present invention to obviate the objections above noted by the provision of a manufacturing method wherein only the most plastic and readily distributable portion of the glass of the pressed blank, which is also the portion that remains uninjured in the pressing operation, is utilized in the formation of the blown article of ware; that is, to form the blown article with a portion to be detached at the end from which it is blown, said detachable portion, termed a "bust-off," being designed to contain the chilled and injured glass, permitting the utilization in the article of ware of that portion only of the pressed blank which retains a substantially uniform heat and is readily workable by blowing. The resultant article is of uniform thickness throughout, and, being machine blown, the ware can be made uniformly of any desired degree of thinness and weight.

It may here be pointed out that hollow glass articles have heretofore been made by hand blowing in paste molds in which it is required that portions be detached by scoring or by heating with a wire or a flame to produce the finished ware. However, the making of such articles with detachable portions has not had in view to provide for the removal of chilled and crushed portions at the open end, as in the present case, there being no pressed blank used in forming hand-blown or paste mold ware.

In the accompanying drawings, reference to which is had in the following detailed description of my process—

Figure 1 shows a mold and blank used in carrying out the process and

Fig. 2 shows the blown article.

In carrying out my invention, I provide a blow mold A which is shaped interiorly and intermediate its ends to form a molding chamber 1 having walls corresponding to the contour desired for the body of the article, as 2, to be formed therein, and also to provide a bottom receptacle 3 designed to receive the glass which constitutes the usual cap 4 which, when the blown blank has passed through the lehr, must be severed from the bottom end, thereof. The mold is made of a height considerably greater than that of a mold in which like articles are formed by pressing or by hand-blowing, the excess height being utilized at and adjacent to the mold mouth to provide a bust-off container or chamber 5 of a length which shall be sufficient to accommodate that portion of the mouth of the pressed blank 6 which is least plastic, due to rapid cooling, which has been crushed in the press-mold, and which contains the cracks, crazes, or fractures, as 7, resulting from chilling contact with the relatively cold mouth of said press-mold. A groove 8 is formed in the top face of the mold and is separated from the bust-off chamber 5 by a shoulder 9 which constitutes a seat for a bead 10 that is formed about the mouth of said pressed blank 6, said bead and said shoulder being designed to coöperate for holding said blank suspended within the mold. Said chamber 5, which at its lowermost part or at the point of its greatest diameter approximates the greatest diameter of the molding chamber 1, is of substantially bell-shape, having its walls flared and describing a wide curve, preferably of compound form, from said shoulder 9 to an inwardly projecting annular rib 11 which separates said chambers 1 and 5 and which forms a throat in which is formed the neck 12 of the article to be blown. The upper face of said rib 11 is sharply inclined and is of considerable extent, extending from the inner edge of the rib to the widest portion of the chamber 5 as shown.

The pressed blank 6 is made of hollow tapered form and of gradually increasing wall thickness from its mouth to its lower end, and it has a length approximating that of the entire molding space of the mold. When said blank has been introduced in the mold and expanding air pressure is applied in the usual manner of machine blowing, the glass is expanded into engagement with the walls of the mold, that portion of the glass which goes to compose the article proper being distributed evenly throughout the molding chamber 1 and producing a body 2 having walls of substantially uniform thickness throughout and, due to the even plasticity of said glass, practically free from imperfections. The upper end of the blank, which contains the glass which is chilled and othewise injured, is expanded into the chamber 5, forming the bust-off 13. In expanding to form said bust-off, the glass travels throughout a considerable distance to reach the widest or most remote portion of the chamber 5 after it has engaged the rib 11 and the upper part of the walls defining said chamber. A choke thus results and the glass is so stretched that a web 14 of extreme, or paper-like, thinness is formed in engagement with the inclined upper face of said rib. Thus the web 14 is readily frangible and, after the annealing operation to which the article is subjected subsequent to the blowing thereof, is broken to remove said bust-off, the line of fracture naturally occurring in said web or at the angle between the neck 12 and said web 14, the glass at said angle being rendered thin and breakable by the provision of a sharp edge or angle 15 at this point in the mold. The rough or ragged edge resulting from the removal of the bust-off, as aforesaid, is removed or smoothed off by filing and grinding. The cap 4 is removed in the usual manner.

What is claimed is—

1. The herein-described method of making lantern globes, which consists in expanding a hollow pressed blank in a machine blow-mold to form a globe body and an integral bust-off with a relatively thin frangible web intermediate said bust-off and said body.

2. A mold for making lantern globes and the like, including a mold having a globe-forming chamber and a bust-off chamber therein, the latter located adjacent to the mouth of the mold, an inwardly projecting annular rib separating said chambers, the inner edge of said rib being designed to shape the neck of the globe, and the upper face of said rib being sharply inclined from said edge to the point of greatest diameter of said bust-off chamber, said rib and the upper walls of said bust-off chamber being so located relatively and the inclination of the upper face of the rib being such that a choke is produced which causes glass when expanded against the walls of said bust-off chamber to be so stretched that the web resting upon the upper face of the rib will be thinner than the rest of the bust-off.

In testimony whereof, I affix my signature in presence of two subscribing witnesses.

ALBERT R. GROTZ.

Witnesses:
 E. E. CARTER,
 CHAS. A. WINDSOR.